United States Patent [19]

Morimoto

[11] Patent Number: 4,773,081

[45] Date of Patent: Sep. 20, 1988

[54] CHANNEL SWITCHING SYSTEM

[75] Inventor: Hideaki Morimoto, Tokyo, Japan

[73] Assignee: NEC Corporation, Tokyo, Japan

[21] Appl. No.: 95,198

[22] Filed: Sep. 11, 1987

[30] Foreign Application Priority Data

Sep. 11, 1986 [JP] Japan .................................. 61-215291

[51] Int. Cl.$^4$ ................................................ H04L 1/02
[52] U.S. Cl. .......................................... 375/40; 455/8;
340/825.01
[58] Field of Search .................... 375/38, 40, 100, 102;
371/8; 370/16; 455/8; 340/825.01, 825.03

[56] References Cited

U.S. PATENT DOCUMENTS

| | | | |
|---|---|---|---|
| 4,143,321 | 3/1979 | Norsworthy | 375/38 |
| 4,380,814 | 4/1983 | Shinmyo | 375/100 |
| 4,395,772 | 7/1983 | Trested, Jr. | 340/825.01 |
| 4,656,645 | 4/1987 | Kaneko | 375/40 |
| 4,680,776 | 7/1987 | Ikeuchi et al. | 370/16 |

Primary Examiner—Robert L. Griffin
Assistant Examiner—Stephen Chin
Attorney, Agent, or Firm—Sughrue, Mion, Zinn, Macpeak & Seas

[57] ABSTRACT

A channel switching system includes a synchronizing switch circuit including: two converters for monitoring input data signals respectively supplied through a regular channel and a stand-by channel, and when continuation of a predetermined number of bits having the same value is detected, outputting data signals for comparison in accordance with a predetermined rule; and a bit comparator for reading out the comparison data signals in response to a common clock signal, comparing bits of the data signals, sequentially changing the order of signal lines of either of the regular channel and the stand-by channel when a bit noncoincidence is detected, and supplying a control signal which instructs channel switching when a bit coincidence is detected.

6 Claims, 3 Drawing Sheets

CHANNEL SWITCHING SYSTEM

BACKGROUND OF THE INVENTION

The present invention relates to a channel switching system and, more particularly, to a channel switching system which can switch a regular channel and a standby channel of a digital radio communication system without generation of a bit error by using a synchronizing switch circuit provided at an output of a reception signal processing circuit of a receiving terminal station without using a frame sync signal.

In a conventional broad-band digital radio communication system of, e.g., a microwave band, a channel switching system for instantaneously switching a regular channel and a stand-by channel by using a synchronizing switch circuit provided at a receiving terminal station is used for maintenance of a channel and as a countermeasure against fading.

In the above conventional channel switching system, in order to switch a regular channel to a stand-by channel, a multiplexed digital signal input from a digital multiplexing unit of a transmitting terminal station is converted from a bipolar code to a unipolar code by a B/U converter. Thereafter, a frame sync signal, a monitor control signal, and the like for monitoring a radio section are inserted in the multiplexed digital signal by a transmission signal processing circuit according to speed conversion, and then, the multiplexed digital signal is supplied parallelly to the regular channel and the stand-by channel through a transmission signal distribution circuit and a transmission signal switch circuit. Two digital signals received through the regular and stand-by channels and demodulated in the receiving terminal station are switched without generation of bit error by a synchronizing switch circuit provided between the frame sync circuit and the reception signal processing circuit of the regular channel after a difference between receiving timings is adjusted using frame sync signals respectively detected from the regular and stand-by channels.

In this system, however, a switching time is prolonged because of a frame sync error generated in the stand-by channel when a transmission signal of the regular channel is parallelly supplied to the stand-by channel. In addition, units which can be switched without generation of bit error are only radio units ranging from a radio transmitting unit including a modulator to a radio receiving unit including a demodulator and does not include the B/U converter, the transmission signal processing circuit, and the reception signal processing circuit. As a system for eliminating the above drawbacks, the present applicant has proposed a channel switching system which could switch a channel section from the B/U converter of the transmitting terminal station to the reception signal processing circuit of the receiving terminal station without generating the frame sync error during switching. FIG. 1 exemplifies an arrangement of this channel switching system, in which only one stand-by channel and one regular channel are shown for the sake of descriptive convenience.

In FIG. 1, a multiplexed digital signal 100 from a digital multiplexing unit (not shown) is supplied to a modulator of a transmitting unit (not shown) through a split circuit 1, a B/U converter 2, and a transmission signal processing circuit 3 and transmitted to the receiving terminal station through a regular channel REG. A reception digital signal demodulated by a demodulator of a receiving unit (not shown) is supplied to a reception signal processing circuit 5 through a frame sync circuit 4, and the frame sync signal, the monitor control signal, and the like inserted at the transmitting terminal station are removed by reverse speed conversion therein. Thereafter, the reception digital signal is supplied to a U/B converter 7 through a synchronizing switch circuit 6, converted into a bipolar code therein and then is supplied as a multiplexed digital signal 101 to a digital multiplexing unit (not shown) through a switch 8.

On the other hand, during a normal operation, a monitor digital signal 102 generated by a pilot generator 9 is supplied to a stand-by channel PROT through a switch 10, a B/U converter 2a, and a transmission signal processing circuit 3a. A reception digital signal received at the receiving terminal station is supplied to a pilot detector 12 through a frame sync circuit 4a, a reception signal processing circuit 5a, a distribution circuit 11, a U/B converter 7a, and the switch 8, thereby monitoring a channel state.

In order to switch the regular channel REG to the stand-by channel PROT, the switch 10 at the transmitting terminal station is operated, and the multiplexed digital signal 100 split by the split circuit 1 is supplied to the stand-by channel PROT parallelly to the regular channel REG. Then, after bit timings of a digital signal 103 supplied through the standby channel PROT and distributed from the distribution circuit 11 and a digital signal 104 supplied through the regular channel REG are coincided with each other in the synchronizing switch circuit 6 at the receiving terminal station, instantaneous switching is performed without generation of bit error without using the frame sync signal. In the synchronizing switch circuit 6, the input signals 103 and 104 are respectively N-frequency-divided and converted by frequency division converters into N parallel data. In this case, each of the regular and stand-by N parallel data has a data length of N bits of an original serial data signal. Therefore, if a receiving timing difference between the data signal supplied through the regular channel and that supplied through the stand-by channel falls within the range of +N/2 bits, the timing difference between both the data signals can be absorbed by reading out them in response to a common clock signal, thereby performing synchronizing switching without generation of bit error. The synchronizing switch circuit 6 further includes signal sequence changers respectively connected to output terminals of the frequency division converters, and a bit comparator for comparing output bits from the signal sequence changers. It is determined which one of the two signal sequence changers is operated in accordance with an output from the comparator. As a result, an influence of initial phase instability of frequency dividers of the frequency division circuits can be eliminated without using the frame sync signal.

In recent years, along with spread of digital signal transmission, a zero continuous suppression code such as a BnZS (Bipolar with n Zeros Substitution) code which transmits continuation of n "0"s which replace a substitution code of a specific pattern including a pulse which violates a bipolar code rule of alternately transmitting positive and negative pulses has been adopted as the standard code of the CCITT instead of a conventional bipolar code (which is also called an AMI signal and is a bipolar RZ (Return-to-Zero) code which alternately assigns positive and negative pulses "+A" and "—A" to "1" of a binary code). That is, a B3ZS code and a B6ZS code are already used, and a B8ZS code is planned to be used.

As for the B3ZS code, refer to Item 5 of CCITT RECOMMENDATION G. 703.

In the conventional digital transmission system using a bipolar code, a scrambled signal is normally used. Therefore, even when information is not inputted at all, the multiplexed digital signal 100 input from the digital multiplexing unit as shown in FIG. 1 has many data conversion points, so that no abnormality occurs in an operation of the synchronizing switch circuit 6. However, when the BnZS code is used, no scrambling is performed. Therefore, when the BnZS code is converted into a unipolar code in the B/U converter 2, the substitution code must be decoded to its original code and then transmitted. As a result, when information is not inputted at all, continuation of the same codes "0" or "1" is generated at an output of the B/U converter 2. In this case, since the scrambling for a radio section is also performed in the transmission signal processing circuit 3, no problem is posed in reproduction of bit synchronization or in smoothing of a spectrum in the radio section. However, since an output from the reception signal processing circuit 5 of the receiving terminal station becomes continuation of "0"s or "1"s similar to the input of the transmission signal processing circuit 3, each of the parallel data signals from the frequency division converters of the synchronizing switch circuit 6 becomes continuation of "0"s or "1"s. As a result, a phase shift based on the initial phase instability of the frequency dividers cannot be detected by bit comparison of the comparator. For this reason, when information is not inputted at all, i.e., in a nonload state and when the number of information inputs is small, i.e., in a light load state, a switching time is prolonged to cause an erroneous operation.

SUMMARY OF THE INVENTION

It is, therefore, a principal object of the present invention to provide a channel switching system which eliminates the above conventional problems, which can be applied when a zero continuous suppression signal such as a BnZS code is used, in which equipment subjected to synchronizing switching includes a transmission signal processing circuit and a reception signal processing circuit, and in which no frame sync error of a radio section occurs during switching.

According to the present invention, there is provided a channel switching system of a digital radio communication system, which switches a regular channel and a stand-by channel without generation of bit error using a transmission switch provided closer to an input side than a transmission signal processing circuit at a transmitting terminal station and a synchronizing switch circuit connected to an output of a reception signal processing circuit at a receiving terminal station, wherein the synchronizing switch circuit comprises: two bit converters for monitoring input data signals input through the regular channel and the stand-by channel, respectively, and when continuation of a predetermined number of bits having the same value is detected, inverting polarities of m bits (m is an integer $\geq 1$) in a data sequence in accordance with a predetermined rule and outputting inverted codes as comparison data signals; two frequency division converters for respectively receiving clock signals, the input data signals, and the comparison data signals to N-frequency-divide (N is an integer $\geq 2$) and convert the clock, input data, comparison data signals into N-phase clock signals, and parallel data signals and parallel comparison signals each consisting of N signal lines; two signal line sequence changers respectively connected to output terminals of the two frequency division converters, for respectively sequentially changing the sequences of the N signal lines by a change control signal and outputting reordered clock, parallel data, parallel comparison data signals; readout means for reading out the reordered parallel data and parallel comparison signals output from the two signal line sequence changers in response to a common clock signal; a bit comparator for comparing bits of the parallel comparison signals read out in response to the common clock signal, supplying the change control signal to either of the signal line sequence changers when a bit difference exceeding a predetermined value is detected, and for supplying the switching control signal when the bit difference does not exceed the predetermined number within a predetermined time interval; a switch controlled by the switching control signal, for selecting the parallel data and N-phase clock signals output from either of the signal line sequence changers; a multiplication converter for N-multiplying the parallel data signal output from the switch and converting the parallel data signal into a serial data signal; and a common clock generator, phase-locked in response to the N-phase clock signal output from the switch, for generating the common clock signal.

DETAILED DESCRIPTION OF THE PREFERRED EMBODIMENT

An embodiment of the present invention will be described below with reference to the accompanying drawings.

Figure 1:
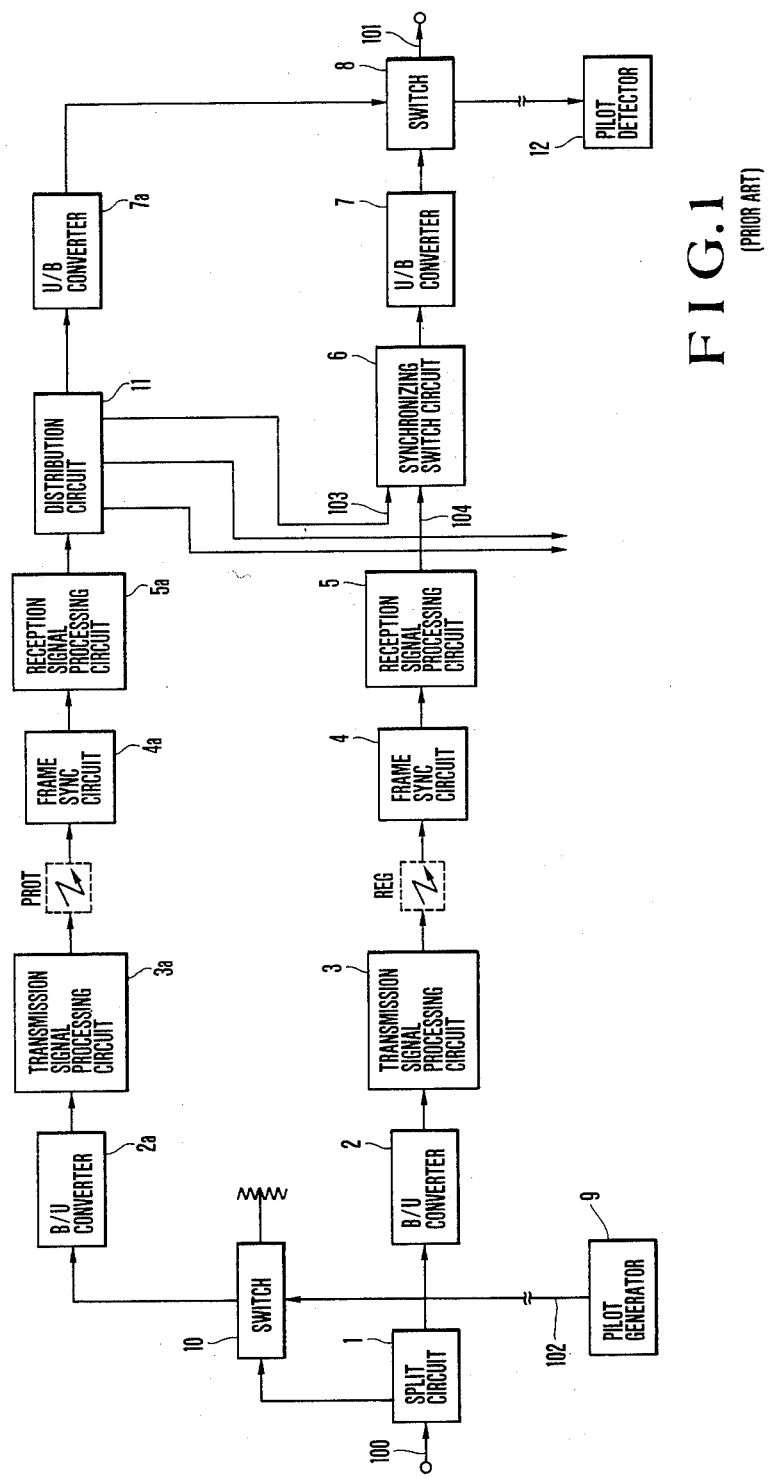
FIG. 1 is a block diagram showing an example of an arrangement of a radio digital communication system to which the present invention is applied.

An arrangement of a digital radio communication system to which the present invention is applied is similar to that shown in FIG. 1, in which B/U converters 2 and 2a and U/B converters 7 and 7a respectively perform mutual conversion between a BnZS code and a unipolar code.

Figure 2:
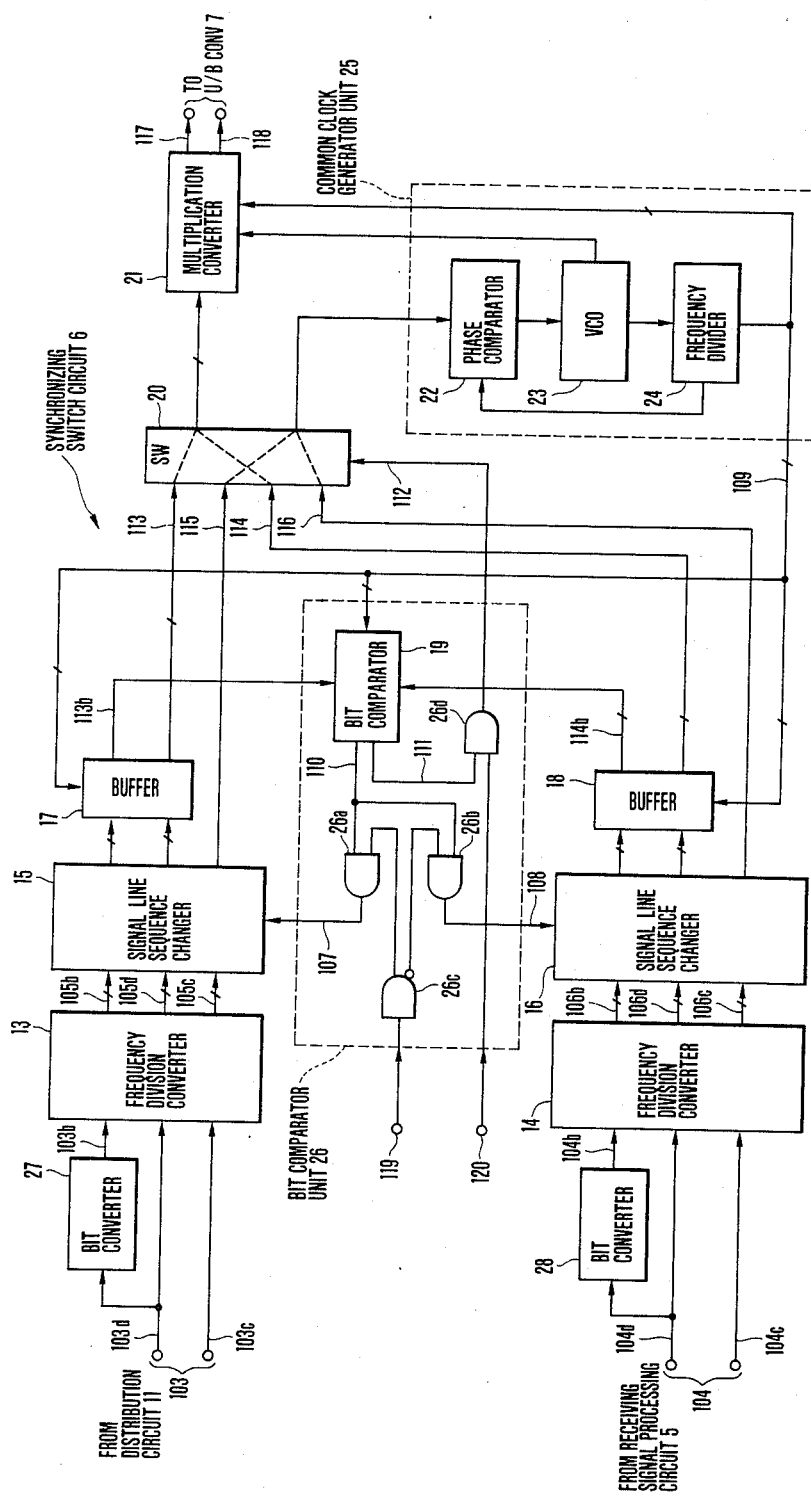
FIG. 2 is a block diagram showing a synchronizing switch circuit of FIG. 1 according to the present invention in detail.

FIG. 2 is a block diagram showing a detailed arrangement of a synchronizing circuit 6 according to the present invention.

In FIG. 2, signals 103 input through a stand-by channel include a data signal 103d and a clock signal 103c, and signals 104 input through a regular channel include a data signal 104d and a clock signal 104c. Each of the data signals 103d and 104d are divided in two signals. The first data signals are input to frequency division converters 13 and 14 through bit converters 27 and 28, respectively, and the second data signals are directly input thereto. The clock signals 103c and 104c are directly input to the frequency division converters 13 and 14.

The frequency division converter 13 N-frequency-divides the data and clock signals 103d and 103c and converts them into a data signal 105d of N parallel lines, a bit period of each of which is expanded N times, and an N-phase clock signal 105c corresponding to the data signal 105d. In addition, when the frequency division converter 13 detects continuation of predetermined number (e.g., N) of bits having the same value in an output signal 103b from the bit converter 27, the frequency division converter 13 inverts the last (Nth) bit, converts it into a data signal 105b for comparison, and supplies the data signal 105b to a signal line sequence changer 15.

The frequency division converter 14 N-frequency-divides the data and clock signals 104d and 104c and converts them into a data signal of N parallel lines and an N-phase clock signal 106c corresponding to the data signal 106d. In addition, when the frequency division converter 14 detects continuation of the N same bits in an output signal 104b from the bit converter 28, the frequency division converter 14 inverts the Nth bit, converts it into a signal 106b for comparison, and supplies the data signal 106b to a signal line sequence changer 16.

The signal line sequence changers 15 and 16 are controlled by control signals 107 and 108, respectively, and can sequentially shift connections between N input signal lines and N output signal lines (one for a clock signal), thereby extracting the first to Nth signal lines as the first signal line of a parallel signal of N lines at an output side with respect to each of a data signal of N lines and a comparison signal of N lines at an input side. The signal line sequence changers 15 and 16 are provided to eliminate an influence of initial phase instability of frequency dividers of the frequency division converters 13 and 14 without using a frame sync signal.

The parallel data signals and the parallel comparison signals output from the signal line sequence changers 15 and 16 are read into buffers 17 and 18 controlled by an N-phase clock signal 109, respectively. Of the output signals from the buffers 17 and 18, parallel comparison signals 113b and 114b are supplied to a bit comparator unit 26, and parallel data signals 113 and 114 are supplied to a switch 20. The bit comparator unit 26 comprises a comparator 19, AND gates 26a, 26b, and 26d, and a complementary circuit 26c for generating two complementary output signals in accordance with an input control signal from a control terminal 119.

The comparator 19 compares bits respectively of the parallel comparison signals 113b and 114b, and when the number of noncoincident bits exceeds a predetermined value, outputs a signal line sequence change signal 110 which represents noncoincidence to one of input terminals of each of the AND gates 26a and 26b. The other input terminals of the AND gates 26a and 26b receives the complementary signals from the complementary circuit 26c, respectively. The signal line sequence changer 15 or 16 determined by a control signal supplied to the control terminal 119 is operated to change sequence of the signal lines. When the number of noncoincident bits is less than the predetermined value, the comparator 19 outputs a control signal 111 which represents a coincidence to the AND gate 26d. The AND gate 26d calculates a logical product of a control signal supplied to a control terminal 120 and the control signal 111, and outputs a switching control signal 112 which represents channel switching to the switch 20. The switch 20 selects the parallel data signal 113 or 114 supplied through the regular or stand-by channel and read out from the buffer 17 or 18 by the common clock signal 109 and reference clock signal (e.g., a clock signal corresponding to a signal of the first line) 115 or 116 of the N-phase clock signal. A parallel data signal output from the switch 20 is converted into an original serial data signal by a multiplication converter 21 and supplied as an output data signal 117 and a clock signal 118 to the U/B converter 7. On the other hand, the reference clock signal selected by the switch 20 is supplied to a common clock generator unit 25 constituted by a phase comparator 22, a voltage controlled oscillator (VCO) 23 and a frequency divider 24, and the above N-phase common clock signal 109 synchronizing with the reference clock signal is generated.

Assume that the regular channel is to be switched to the stand-by channel. In this case, the switch 20 selects the parallel data signal 113 and the reference clock signal 115 at the regular channel side, and a signal of logical "1" is supplied to the control terminal 119 of the bit comparator unit 26. Therefore, only the control signal 107 is supplied to the signal line sequence changer 15, and an initial phase of the frequency division converter 13 is adjusted by changing the sequence of the parallel data signal in the stand-by channel. When channel switching is instructed and the transmission signals are parallelly transmitted to the stand-by channel PROT, and when bits of both the signals coincide with each other and the control signal 111 is output from the comparator 19, the AND gate 26d calculates a logical product of the control signal supplied to the control terminal 120 and the control signal 111 and outputs the control signal 112 to the switch 20. As a result, the parallel data signal 114 and the reference clock signal 116 supplied through the stand-by channel are selected. At this time, even if a phase is abruptly changed because the regular reference clock signal is switched to the stand-by reference clock signal, the common clock signal 109 is not abruptly changed since an output from the voltage controlled oscillator 23 is frequency-divided and supplied thereto. That is, the phase of the common clock signal 109 is gradually changed, and the common clock signal 109 synchronizes with the stand-by reference clock signal 115.

Figure 3:
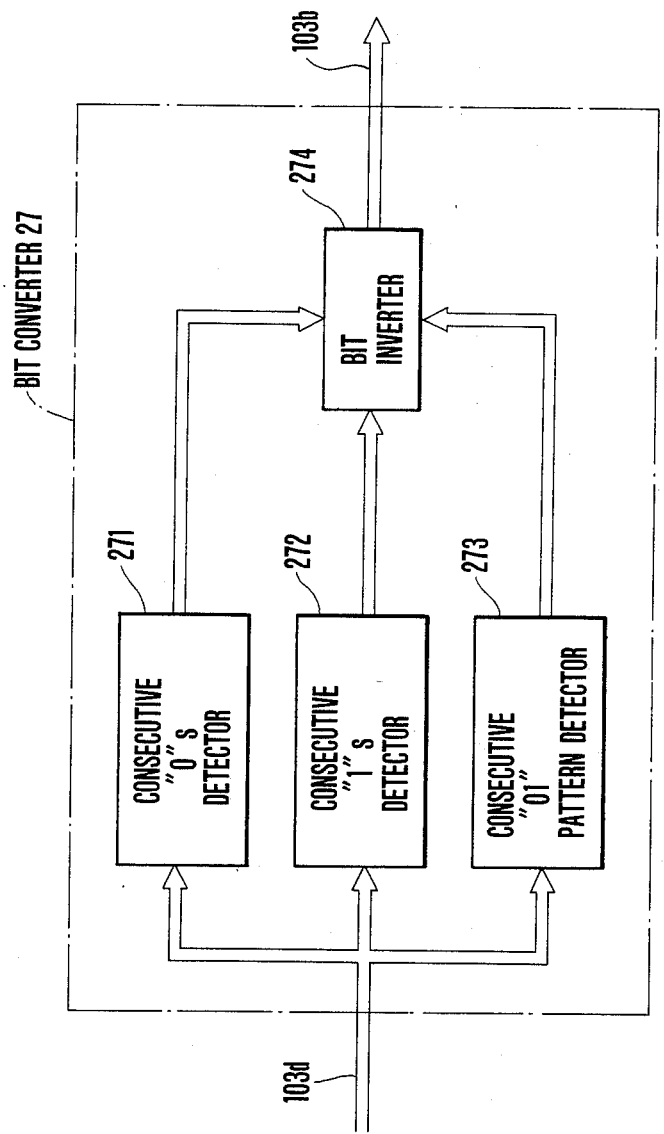
FIG. 3 is a block diagram showing an example of an arrangement of the bit converter shown in FIG. 2.

FIG. 3 shows an example of an arrangement of the bit converter 27. In FIG. 3, the data signals 103d are input to a consecutive "0"s detector 271, a consecutive "1"s detector 272, and a consecutive "01" pattern detector 273. The consecutive "0"s detector 271 outputs 4 bits (0000) to a bit inverter 274 when "0"s of 4 bits or more are continuously input thereto.

The consecutive "1"s detector 272 outputs 4 bits (1111) to the bit inverter 274 when "1"s of 4 bits or more are continuously input thereto.

The consecutive "01" pattern detector 273 outputs 4 bits (0101) to the bit inverter 274 when "01" patterns of 4 bits or more are continuously input thereto.

The bit inverter 274 inverts a predetermined one of 4 bits, e.g., the last bit. That is, "0000" is converted into "0001", "1111" is converted into "1110", and "0101" is converted into "0100". Converted 4-bit data 103b is output to the frequency division converter 13.

An arrangement of the bit converter 28 is the same as that of the bit converter 27.

The above bit converter can be applied to an arbitrary BnZS code.

The synchronizing switch circuit 6 of this embodiment performs the same operation as that of a conventional synchronizing switch circuit except that the synchronizing switch circuit 6 uses comparison data signals 113*b* and 114*b* obtained by modifying the input data signals 103*d* and 104*d* which include a continuation of bits having the same value, in accordance with a predetermined rule, as input signals of the bit comparator unit 26 for generating the control signals 107 and 108 supplied to the signal line sequence changers 15 and 16 by inserting the bit converters 27 and 28 and the control signal 112 supplied to the switch 20.

According to the above arrangement, if each of the input data signals 103*d* and 104*d* is continuation of "0"s, "1" is included in each of the output data signals 103*b* and 104*b* from the bit converters 27 and 28 in units of N bits. Therefore, one signal line of each of the parallel signals 105*b* and 106*b* of N lines from the frequency division converters 13 and 14 goes to "1", and all other signal lines go to "0". For this reason, when a signal line which goes to "1" in the parallel signal 105*b* is different from that of the parallel signal 106*b*, the bit comparator unit 26 easily detects this, and a signal line sequence is changed. That is, assume that channel switching is instructed when information is not inputted at all. In this case, when a super frame sync signal (supplied from the digital multiplexing unit) is received, an initial phase is properly adjusted in a "0" period subsequent to this reception on the basis of the super frame sync signal. Thereafter, when a coincidence between bits of a predetermined period (normally, several super frame periods) is detected, the control signal 112 is output to perform switching.

On the contrary, in a conventional synchronizing switch circuit not including the bit converters 27 and 28, the "0" period except for the super frame sync signal period does not serve as effective information for generating the change control signal. Therefore, in order to detect a predetermined bit noncoincidence and supply the change control signal, bit comparison must be performed throughout a plurality of super frames for a long time period. That is, it takes a long time to adjust the initial phase, it is difficult to distinguish and set the lower limit bit noncoincidence count as a condition for supplying the change control signal and the upper limit bit noncoincidence count as a condition for supplying the switching control signal, and an erroneous operation tends to occur because of a small design margin. On the other hand, in the synchronizing switch circuit 6 of this embodiment shown in FIG. 2, the "0" period can be utilized as an effective information period for changing the sequence of signal lines after the super frame sync signal is received. In addition, since the supply conditions for the change control signal and the switching control signal are flexible, no erroneous operation occurs.

In the synchronizing switch circuit shown in FIG. 2, when a bit error occurs in either of the regular and stand-by channels while "0"s continue, change of signal line sequence sometimes occurs because one of the bit converters 27 and 28 is reset. However, if the super frame sync signal is input, signal sequences are changed again to restore the proper state, and then switching is performed after a bit coincidence within a predetermined period is confirmed. Note that if a reset condition of the bit converter 27 or 28 is set in consideration of a code format of the super frame sync signal, the above phenomenon does not occur by a single bit error.

The description has been made with reference to the case wherein information is not input at all and only the super frame sync signal is transmitted, i.e., the case of no load. However, the same effect as described above can be obtained in the case wherein the number of information inputs is small and the "0" periods are many, i.e., the case of a light load. Note that the present invention does not adversely affect an operation in the case of a normal load wherein a mark rate is close to 50%. In addition, an arrangement of the digital radio communication system to which the present invention is applied has been described with reference to FIG. 1. However, another switch may be provided between the B/U converter and the transmission signal processing circuit of the transmitting terminal station to perform parallel transmission.

In the synchronizing switch circuit described above, outputs from the signal sequence changers 15 and 16 are read out to the buffers 17 and 18. However, buffer functions with respect to the parallel comparison signal and the parallel data signal can be assigned to both the bit comparator 26 and the multiplication converter 21 in a divided manner. In addition, for the sake of easy understanding, the bit converters 27 and 28 invert only the Nth bits of the identical codes. However, the two bit converters may be arranged to perform code inversion in accordance with the same rule.

As has been described above, the present invention effectively realizes a channel switching system which can positively operate with respect to a transmission system using a zero continuous suppression code such as a BnZS code, which includes a transmission signal processing circuit and a reception signal processing circuit as equipment subjected to synchronizing switching, and in which no frame sync error occurs in a channel during switching.

What is claimed is:

1. A channel switching system of a digital radio communication system, which switches a regular channel and a stand-by channel without generation of code error using a transmission switch provided closer to an input side than a transmission signal processing circuit at a transmitting terminal station and a synchronizing switch circuit connected to an output of a reception signal processing circuit at a receiving terminal station, wherein said synchronizing switch circuit comprises:

two bit converters for monitoring input data signals input through said regular channel and said stand-by channel, respectively, and when continuation of a predetermined number of bits having the same value is detected, inverting polarities of m bits (m is an integer $\geq 1$) in a data in accordance with a predetermined rule and outputting the data subjected to the inversion as comparison data signals;

two frequency division converters for respectively receiving clock signals, the input data signals, and the comparison data siganls to N-frequency-divide (N is an integer $\geq 2$) and convert the clock, input data, comparison data signals into N-phase clock signals, and parallel data signals and parallel comparison signals each consisting of N signal lines;

two signal line sequence changers respectively connected to output terminals of said two frequency division converters, for respectively sequentially changing the sequences of N signal lines by a change control signal and outputting reordered clock, parallel data, and parallel comparison data signals;

readout means for reading out the reordered parallel data and parallel comparison signals output from the two signal line sequence changers in response to a common clock signal;

a bit comparator for comparing bits of the reordered parallel comparison signals read out in response to the common clock signal, supplying the change control signal to either of said signal line sequence changers when a bit difference exceeding a predetermined value is detected, and for supplying a switching control signal when the bit differences does not exceed the predetermined number within a predetermined time interval;

a synchronizing switch controlled by the switching control signal, for selecting the reordered parallel data and N-phase clock signals output from either of said signal line sequence changers;

a multiplication converter for N-multiplying the reordered parallel data signal output from said synchronizing switch and converting the reordered parallel data signal into a serial data signal; and a common clock generator, phase-locked in response to the N-phase clock signal output from said synchronizing switch, for generating the common clock signal.

2. A channel switching system of a digital radio communication system, which switches a regular channel and a stand-by channel without generation of code error using a transmission switch provided closer to an input side than a transmission signal processing circuit at a transmitting terminal station and a synchronizing switch circuit connected to an output of a reception signal processing circuit at a receiving terminal station, wherein said synchronizing switch circuit comprises:

two bit converters for monitoring digital input data signals which are inputted through said regular channel and said stand-by channel, respectively, for inverting polarities of m bits (where m is an integer) in the digital input data signals in accordance with a predetermined rule when a predetermined number of consecutive bits having the same value is detected, and for outputting the digital input data signals subjected to the inversion as comparison data signals;

two frequency division converters, each of said frequency division converters receiving clock signals, the digital input data signals, and the comparison data signals for N-frequency dividing (where N is an integer) and converting the clock, digital input data, and comparison data signals into N-phase clock signals, parallel data signals, and parallel comparison signals, respectively, each of said N-phase clock, parallel data, and said parallel comparison signals being supplied from said frequency division converter through N signal lines;

two signal line sequence changers respectively connected to output terminals of said two frequency division converters, each of said two signal line sequence changers being operable for sequentially changing the sequences of the N signal lines in response to a control signal, thereby outputting reordered clock, parallel data, and parallel comparison data signals;

readout means for reading out the reordered parallel data and parallel comparison signals which are outputted from said two signal line sequence changers in response to a common clock signal;

a bit comparator for comparing bits of the parallel comparison signals read out in response to the common clock signal, for supplying a change control signal to one of said signal line sequence changers when a bit difference exceeding a predetermined value is detected within a predetermined time intervals, and for supplying a switching control signal when the bit difference does not exceed the predetermined number within a predetermined time interval;

a synchronizing switch, controlled by the switching control signal, for selecting the reordered parallel data and N-phase clock signals which are outputted from one of said signal line sequence changers;

a multiplication converter for N-multiplying the reordered parallel data signal outputted from said synchronizing switch, thereby converting the reordered parallel data signal into a serial data signal; and a common clock generator which is phase-locked in response to the N-phase clock signals outputted from said switch, for generating the common clock signal.

3. The channel switching system according to claim 2, wherein said common clock generator comprises a phase comparator for receiving a reference clock signal from said synchronizing switch, a voltage controlled oscillator connected to said phase comparator and to said multiplication converter, and a frequency divider connected to said voltage controlled oscillator for supplying the common clock signal.

4. The channel switching system according to claim 2, wherein each of said bit converters comprises, a bit inverter, a consecutive 0-bit detector circuit for supplying the predetermined number of bits to said bit inverter when the input data signals contain at least the predetermined number of consecutive 0-bits, a consecutive 1-bit detector circuit for supplying the predetermined number of bits to said bit inverter when the input data signals contain at least the predetermined number of consecutive 1-bits, and a consecutive 01-bit pattern detector for supplying the predetermined number of bits to said when the input data signals contain at least the predetermined number of consecutive 01-bit patterns.

5. The channel switching system according to claim 2, wherein each of said two frequency converters contains means for inverting the last bit of said comparison data signal.

6. The channel switching system according to claim 2, further comprising logical gate means, connected to said bit comparator, for supplying the change control signal to one of said signal line sequence changers, and for supplying the switching control signal to said synchronizing switch.

* * * * *